W. H. McCLANAHAN.
EARTH-PULVERIZER.

No. 185,940. Patented Jan. 2, 1877.

UNITED STATES PATENT OFFICE.

WILLIAM H. McCLANAHAN, OF FRANKLIN, INDIANA.

IMPROVEMENT IN EARTH-PULVERIZERS.

Specification forming part of Letters Patent No. 185,940, dated January 2, 1877; application filed June 27, 1876.

*To all whom it may concern:*

Be it known that I, WILLIAM H. McCLANAHAN, of Franklin, in the county of Johnson, and in the State of Indiana, have invented certain new and useful Improvements in Pulverizers; and do hereby declare that the following is a full, clear, and exact description thereof, reference being had to the accompanying drawings and to the letters of reference marked thereon, making a part of this specification.

The nature of my invention consists in the construction of a sod-cutter and clod-pulverizer, as hereinafter more fully set forth.

In order to enable others skilled in the art to which my invention appertains to make and use the same, I will now proceed to more fully describe my invention, reference being had to the accompanying drawings, forming a part of this specification, in which—

Figure 1:
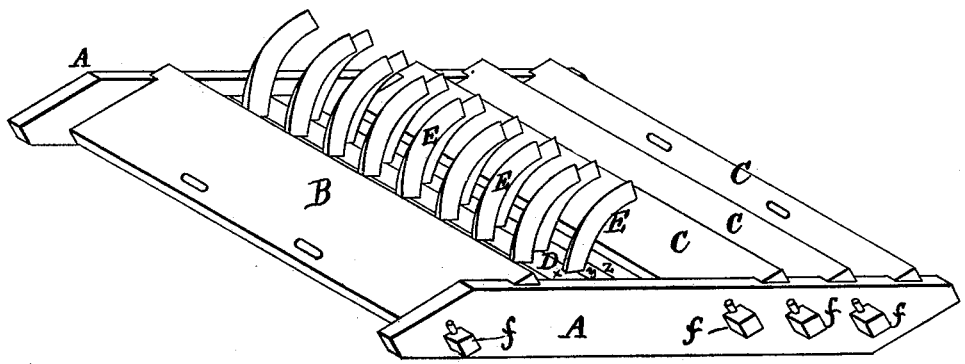
Figure 2:
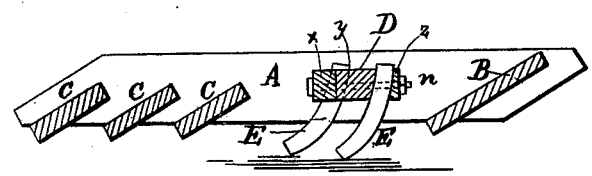
Figure 3:
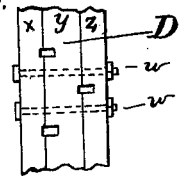

Figure 1 represents a perspective view of the under part of my invention. Fig. 2 represents a longitudinal section of the device in proper position for operation. Fig. 3 is a broken view, showing the formation of the bar which holds the colters or cutters.

The implement is composed of two side bars, A A, having inclined grooves on their inner faces, into which is placed, at the front, a broad cross-bar, B, which projects a short distance below the lower edges of the side bars. In the rear of this bar B is placed a sectional cross-bar, D, carrying the colters or cutters, as hereinafter more specifically described. In the rear of the colter-bar is arranged a series, (two, three, or more,) of inclined pulverizing-bars, C C C, which also project below the lower edges of the side bars A A. The bars C C and B are all arranged at an angle of about thirty degrees, and have their ends fitted into the inclined grooves in the side bars A.

If preferred, each end of each of said bars may be provided with a tenon, $f$, and passed through openings in the side bars, and there secured by pins, as seen in Fig. 1.

The colter-bar D is composed of three strips, $x\ y\ z$, (see Fig. 3,) and the colters or cutters are inserted in vertical slots in the bars, and the bars and colters clamped together by bolts $w\ w$. Each colter E is made curved, and sharpened on the front, vertically adjustable in the slots in the bars, and arranged in two rows, in jaggered form, so that no one colter will be directly in front of the other.

By connecting the colters in the manner above described they can be easily detached, and new ones substituted therefor; or they can as easily be adjusted up or down, to accommodate the condition of the ground to be worked upon.

Whenever it is desired to draw the implement from one field to another, or to prevent the colters and pulverizing-bars from operating, the entire frame-work is turned upside down, as shown in Fig. 1, and drawn over the earth, the top edges of the side bars A A acting as runners for the same.

In operation, the device is drawn forward, so that the colters cut the sod and clods, and the pulverizing-bars powder the earth as they pass over the same.

Having thus fully described my invention, what I claim as new, and desire to secure by Letters Patent, is—

The combination of the side bars A A, the inclined cross-bar B, the colter-bar D, formed of the three slotted strips $x\ y\ z$, and carrying the curved knives E E, and the series of angularly-arranged pulverizing-bars C C C, all constructed substantially as and for the purposes herein set forth.

In testimony that I claim the foregoing I have hereunto set my hand this 10th day of June, 1876.

WILLIAM H. McCLANAHAN.

Witnesses:
GABRIEL M. OVERSTREET,
HARVEY C. WINCHESTER.